Dec. 7, 1965   E. I. BETENSKY ETAL   3,221,601
FOUR COMPONENT SYMMETRICAL PROJECTION OBJECTIVE
Filed July 30, 1962

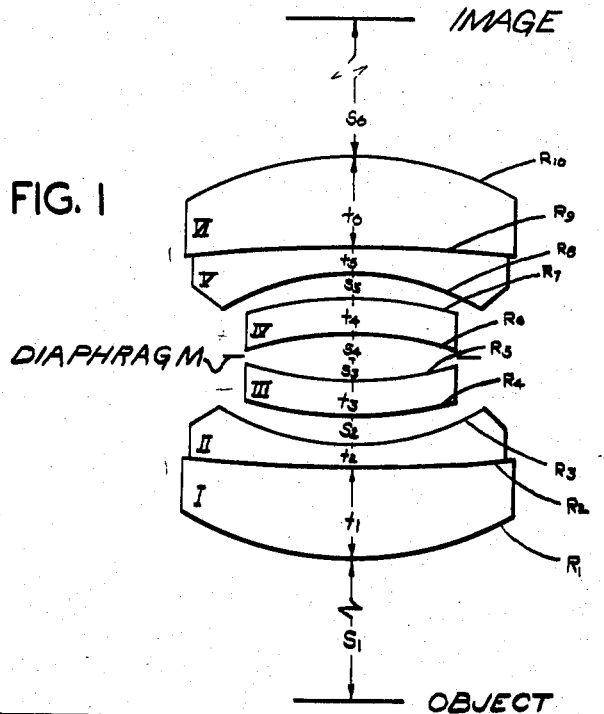

FIG. 1

| E.F.L. = 239.195 | | f/4.5 AT INFINITY | | | | |
|---|---|---|---|---|---|---|
| LENS | RADII | FOCAL LENGTH | THICKNESS | SPACES | $n_D$ | $\nu$ |
| I | $R_1$ = 63.947<br>$R_2$ = 428.549 | 103.803 | $t_1$ = 17.0 | $S_1$ = 442.52 | 1.700 | 48.0 |
| II | $R_3$ = 47.863<br>$R_4$ = 73.1139 | -87.819 | $t_2$ = 4.6 | $S_2$ = 4.8 | 1.605 | 38.0 |
| III | $R_4$ = 73.1139<br>$R_5$ = 109.648 | 317.450 | $t_3$ = 6.5 | $S_3$ = 5.2 | 1.638 | 55.5 |
| IV | $R_6$ = -109.648<br>$R_7$ = -73.1139 | 317.450 | $t_4$ = 6.5 | $S_4$ = 5.2 | 1.638 | 55.5 |
| V | $R_8$ = -47.863<br>$R_9$ = -428.519 | -87.819 | $t_5$ = 4.6 | $S_5$ = 4.8 | 1.605 | 38.0 |
| VI | $R_9$ = -428.519<br>$R_{10}$ = -63.947 | 103.803 | $t_6$ = 17.0 | $S_6$ = 442.52 | 1.700 | 48.0 |

FIG. 2

ELLIS I. BETENSKY
NATHAN RICKLESS
*INVENTORS*

BY Frank C. Parker

ATTORNEY

FOUR COMPONENT SYMMETRICAL PROJECTION OBJECTIVE

Ellis I. Betensky, Rochester, and Nathan Rickless, Brighton, N.Y., assignors to Bausch & Lomb Incorporated, Rochester, N.Y., a corporation of New York
Filed July 30, 1962, Ser. No. 213,226
3 Claims. (Cl. 88—57)

The present invention relates generally to projection objectives used in copying or process work and more particularly to improvements in symmetrical objectives.

It is an object of this invention to provide a novel symmetrical projection objective for copy or process work, said objective having a relative aperture of $f/4.5$ at infinity, being of symmetrical form and working at equal conjugates, the objective furthermore being corrected for chromatic and monochromatic aberrations, including field curvature and distortion, the objective being particularly designed for the transmission of light within the range of 440 to 580 mu, and having a semi angular field of substantially 20°.

Further objects and advantages will be apparent from a study of the details of said objective described in the specification herebelow and shown in the accompanying drawing wherein FIG. 1 is an optical diagram of a preferred form of an objective constructed according to this invention, and FIG. 2 is a chart giving the constructional data related to said objective.

As shown in the drawing, the objective is indicated generally by numeral 10, the construction thereof being symmetrical and consisting of a pair of compound negative meniscus lenses between which is optically aligned a pair of singlet positive meniscus lenses. A diaphragm is arranged symmetrically between said positive lenses, and all of the refractive surfaces of said compound and singlet lenses are concave toward said diaphragm.

Each of said compound lenses consist of an outer positive meniscus lens element I or VI which is mounted in complete contact with an inner negative meniscus element II or V respectively, the interface therebetween being designated $R_2$ or $R_9$ respectively. Each of the singlet lenses III or IV consist of a single piece of glass and these lenses are symmetrically spaced from an intervening diaphragm and between the compound lenses I, II and V, VI.

According to this invention, the identifying parameters of the objective 10 should be as specified hereinafter for achievement of the objects of this invention. Among said parameters is included a specification of focal lengths of the individual lens elements I to VI as follows, $$F_I = F_{VI} = .433F$$
$$F_{II} = F_V = -.369F$$
$$F_{III} = F_{IV} = 1.324F$$

wherein F designates the equivalent focal length of said objective and $F_I$ to $F_{VI}$ designates the focal lengths of the aforesaid individual lens elements.

Further parameters are specified relative to the airspaces $S_2$ and $S_5$ located between the compound lenses and singlet lenses, and the airspaces $S_3$ and $S_4$ located between the singlet lenses and said diaphragm as follows, $$S_2 = S_5 = .020F$$
$$S_3 = S_4 = .0217F$$

For best optical performance, the refractive index $n_D$ for the D line of the spectrum and the Abbe number $v$ of the glasses from which the lens elements I to VI are formed should be substantially as stated in the table of values herebelow, $$n_D(I) = n_D(VI) = 1.700$$
$$n_D(II) = n_D(V) = 1.605$$
$$n_D(III) = n_D(IV) = 1.638$$
$$v(I) = v(VI) = 48.0$$
$$v(II) = v(V) = 38.0$$
$$v(III) = v(IV) = 55.5$$

Furthermore the preferred values for the successive refractive lens surfaces which are designated $R_1$ to $R_{10}$ should be as given in the table herebelow, $$R_1 = R_{10} = .267F$$
$$R_2 = R_9 = 1.793F$$
$$R_3 = R_8 = .200F$$
$$R_4 = R_7 = .306F$$
$$R_5 = R_6 = .457F$$

and the corresponding successive lens thickness $t_1$ to $t_6$ should be substantially as stated in the table herebelow, $$t_1 = t_6 = .0712F$$
$$t_2 = t_5 = .0192F$$
$$t_3 = t_4 = .0271F$$

Stated in another manner, the above mentioned constructional parameters are given in the chart herebelow and in FIG. 2 of the drawing, the legends used therein having the same meaning as explained heretofore.

[E.F.L. = 239.195. $f/4.5$ at infinity. Transmission range = 440–580 mu]

| Lens | Radii | Focal Lgth. | Lens Thickness | Spaces | $n_D$ | $v$ |
|---|---|---|---|---|---|---|
|  |  |  |  | $S_1 = 442.52$ |  |  |
| I | $R_1 = 63.947$ | $F_I = 103.803$ | $t_1 = 17.0$ |  | 1.700 | 48.0 |
|  | $R_2 = 428.549$ |  |  |  |  |  |
| II |  | $F_{II} = -87.819$ | $t_2 = 4.6$ |  | 1.605 | 38.0 |
|  | $R_3 = 47.863$ |  |  |  |  |  |
|  |  |  |  | $S_2 = 4.8$ |  |  |
|  | $R_4 = 73.114$ |  |  |  |  |  |
| III |  | $F_{III} = 317.45$ | $t_3 = 6.5$ |  | 1.638 | 55.5 |
|  | $R_5 = 109.648$ |  |  |  |  |  |
|  |  |  |  | $S_3 = 5.2$ |  |  |
|  |  |  | Diaphragm |  |  |  |
|  |  |  |  | $S_4 = 5.2$ |  |  |
|  | $R_6 = -109.648$ |  |  |  |  |  |
| IV |  | $F_{IV} = 317.45$ | $t_4 = 6.5$ |  | 1.638 | 55.5 |
|  | $R_7 = -73.114$ |  |  |  |  |  |
|  |  |  |  | $S_5 = 4.8$ |  |  |
|  | $R_8 = -47.863$ |  |  |  |  |  |
| V |  | $F_V = -87.819$ | $t_5 = 4.6$ |  | 1.605 | 38.0 |
|  | $R_9 = -428.549$ |  |  |  |  |  |
| VI |  | $F_{VI} = 103.803$ | $t_6 = 17.0$ |  | 1.700 | 48.0 |
|  | $R_{10} = -63.947$ |  |  |  |  |  |
|  |  |  |  | $S_6 = 442.52$ |  |  |

Although only a single form of this invention has been shown and described in detail, changes may be made in the specific constructional parameters named in the specification within a range commensurate with good manufacturing practices without departing from the spirit of the invention as defined in the claims herebelow appended.

We claim:

1. A symmetrical projection objective for copying and process work at a transmission range of 440 to 580 mu at substantially unity magnification, said objective comprising a pair of negative compound meniscus lenses, and a pair of positive singlet meniscus lenses optically aligned symmetrically between said first pair and symmetrically spaced from an interposed diaphragm, each said pair of lenses having all of their refractive surfaces concave toward said diaphragm, and the half field angle being substantially 20°, said compound lenses being composed of an outward positive meniscus element and inner negative meniscus element whose adjoining refractive surfaces lie in complete contact with each other to form an interface, the focal lengths of the successive lens elements represented by $F_I$ to $F_{VI}$ being given substantially in the following table of mathematical expressions wherein F designates the equivalent focal length of said objective, $$F_I = F_{VI} = .433F$$
$$F_{II} = F_V = -.369F$$
$$F_{III} = F_{IV} = 1.324F$$

The airspaces $S_2$ and $S_5$ between said compound and singlet members having values which are substantially as follows, $$S_2 = S_5 = .020F$$

the airspaces $S_3$ and $S_4$ between said singlet lenses and said diaphragm having values which are substantially as follows, $$S_3 = S_4 = .0217F$$

and the refractive index $n_D$ and Abbe number $\nu$ of the successive lenses $n_D(I)$ to $n_D(VI)$ and $\nu(I)$ to $\nu(VI)$ having refractive values which are substantially as given herebelow in the table herebelow, $$n_D(I) = n_D(VI) = 1.700$$
$$n_D(II) = n_D(V) = 1.605$$
$$n_D(III) = n_D(IV) = 1.638$$
$$\nu(I) = \nu(VI) = 48.0$$
$$\nu(II) = \nu(V) = 38.0$$
$$\nu(III) = \nu(IV) = 55.5$$

2. A symmetrical projection objective for copying use and the like at substantially unity magnification, said objective comprising a pair of negative compound meniscus lenses, and a pair of positive singlet meniscus lenses optically aligned symmetrically between said first pair and symmetrically spaced from an interposed diaphragm, each said pair of lenses having all of their refractive surfaces concave toward said diaphragm, and the half fluid angle being substantially 20°, said compound lenses being composed of an outward positive meniscus element and an inner negative meniscus element whose adjoining refractive surfaces lie in complete contact with each other to form an interface, the values of radii for the successive refractive lens surfaces $R_1$ to $R_{10}$ being given substantially in the table herebelow, $$R_1 = R_{10} = .267F$$
$$R_2 = R_9 = 1.793F$$
$$R_3 = R_8 = .200F$$
$$R_4 = R_7 = .306F$$
$$R_5 = R_6 = .457F$$

the value for the successive lens thicknesses $t_1$ to $t_6$ being substantially as given herebelow, $$t_1 = t_6 = .0712F$$
$$t_2 = t_5 = .0192F$$
$$t_3 = t_4 = .0271F$$

the values of the successive surfaces $S_1$ to $S_4$ being substantially as given herebelow, $$S_2 = S_5 = .020F$$
$$S_3 = S_4 = .0217F$$

and the refractive index $n_D$ and Abbe number $\nu$ of said successive lenses $n_D(I)$ to $n_D(VI)$ and $\nu(I)$ to $\nu(VI)$ having respective values substantially as given herebelow, $$n_D(I) = n_D(VI) = 1.700$$
$$n_D(II) = n_D(V) = 1.605$$
$$n_D(III) = n_D(IV) = 1.638$$
$$\nu(I) = \nu(VI) = 48.0$$
$$\nu(II) = \nu(V) = 38.0$$
$$\nu(III) = \nu(IV) = 55.5$$

3. A symmetrical projection objective for copying use and the like at substantially unity magnification, said objective comprising a pair of negative compound meniscus lenses, and a pair of positive singlet meniscus lenses optically aligned symmetrically between said first pair and symmetrically spaced from an interposed diaphragm, each said pair of lenses having all of their refractive surfaces concave toward said diaphragm, and the half field angle being substantially 20°, said compound lenses being composed of an outward positive meniscus element and an inner negative meniscus element whose adjoining refractive surfaces lie in complete contact with each other to form an interface, the constructional data for said objective being given in the chart below wherein $R_1$ to $R_{10}$ designate the successive lens surfaces, $t_1$ to $t_6$ represents the successive lens thicknesses, $S_2$ to $S_5$ represents the successive interlens airspaces, $n_D$ and $\nu$ represent respectively the refractive index and Abbe number of the optical materials used in the lenses, and $F_I$ to $F_{VI}$ designates the focal lengths thereof,

[E.F.L.=239.195. f/4.5 at infinity. Transmission range=440 to 580 mu]

| Lens | Radii | Focal Lgth. | Lens Thickness | Spaces | $n_D$ | $\nu$ |
|---|---|---|---|---|---|---|
| | | | | $S_1=442.52$ | | |
| I | $R_1=63.947$ | $F_I=103.803$ | $t_1=17.0$ | | 1.700 | 48.0 |
| | $R_2=428.549$ | | | | | |
| II | $R_3=47.863$ | $F_{II}=-87.819$ | $t_2=4.6$ | | 1.605 | 38.0 |
| | | | | $S_2=4.8$ | | |
| | $R_4=73.114$ | | | | | |
| III | | $F_{III}=317.45$ | $t_3=6.5$ | | 1.638 | 55.5 |
| | $R_5=109.648$ | | | | | |
| | | | Diaphragm | $S_3=5.2$ | | |
| | | | | $S_4=5.2$ | | |
| | $R_6=-109.648$ | | | | | |
| IV | | $F_{IV}=317.45$ | $t_4=6.5$ | | 1.638 | 55.5 |
| | $R_7=-73.114$ | | | | | |
| | | | | $S_5=4.8$ | | |
| | $R_8=-47.863$ | | | | | |
| V | | $F_V=-87.819$ | $t_5=4.6$ | | 1.605 | 38.0 |
| | $R_9=-428.549$ | | | | | |
| VI | | $F_{VI}=103.803$ | $t_6=17.0$ | | 1.700 | 48.0 |
| | $R_{10}=-63.947$ | | | | | |
| | | | | $S_6=442.52$ | | |

References Cited by the Examiner

UNITED STATES PATENTS 2,601,593   6/1952   Cook _____ 88—57
2,601,595   6/1952   Cook _____ 88—57
2,635,505   4/1953   Schade _____ 88—57

FOREIGN PATENTS 218,764   12/1961   Australia.
547,739   9/1942   Great Britain.

JEWELL H. PEDERSEN, *Primary Examiner.*